United States Patent [19]
Dimitri

[11] Patent Number: 5,729,464
[45] Date of Patent: Mar. 17, 1998

[54] MEDIA IDENTIFICATION IN AN AUTOMATED DATA LIBRARY

[75] Inventor: Kamal Emile Dimitri, Tucson, Ariz.

[73] Assignee: International Business Machines Corporation, Armonk, N.Y.

[21] Appl. No.: 537,037

[22] Filed: Sep. 29, 1995

[51] Int. Cl.⁶ .............. G06F 17/00; G11B 17/22
[52] U.S. Cl. .............. 364/478.03; 369/34; 369/36
[58] Field of Search ......... 364/478.01, 478.02–478.07, 364/478.13, 478.14, 479.01, 479.12; 360/69, 71, 92, 98.01, 98.04–98.06; 369/34–36, 38, 178, 180, 191, 192, 194, 195; 235/383, 385, 462, 464; 414/273, 274

[56] References Cited

U.S. PATENT DOCUMENTS

| | | | |
|---|---|---|---|
| 3,958,104 | 5/1976 | Zuckerman | 235/61.11 E |
| 4,675,856 | 6/1987 | Rudy et al. | 369/36 |
| 4,817,070 | 3/1989 | Hug et al. | 369/36 |
| 5,059,772 | 10/1991 | Younglove | 235/383 |
| 5,103,081 | 4/1992 | Fisher et al. | 235/464 |
| 5,303,214 | 4/1994 | Kulakowski et al. | 369/34 |
| 5,323,327 | 6/1994 | Carmichael et al. | 364/478 |

FOREIGN PATENT DOCUMENTS

| | | | |
|---|---|---|---|
| 2625348 | 12/1988 | France | G06K 9/18 |
| 3402375 | 7/1985 | Germany | G11B 23/04 |
| 63-306581 | 12/1988 | Japan | G11B 23/30 |
| 5-222584 | 2/1992 | Japan | C25D 11/18 |
| 4096192 | 3/1992 | Japan | G06K 19/06 |
| 5-324943 | 12/1993 | Japan | G06K 19/06 |

*Primary Examiner*—Reba I. Elmore
*Assistant Examiner*—Steven R. Garland
*Attorney, Agent, or Firm*—R. M. Sullivan; D. A. Shifrin

[57] ABSTRACT

One or more stationary bar code readers are provided in an automated storage library to monitor the movement of magazines, cartridges and/or disks within the library and to maintain an updated inventory on the location of each item in the library. Preferably, a reader is positioned at the head of each column of storage cells and at the front of each drive unit. Each magazine and cartridge has a linear bar code label and each bare disk has a concentric bar code label. Each label is fixed to a surface visible to the readers whereby, as a magazine, cartridge or disk is passed in front of a reader, the label is read, decoded and the information used to update a library inventory table.

14 Claims, 3 Drawing Sheets

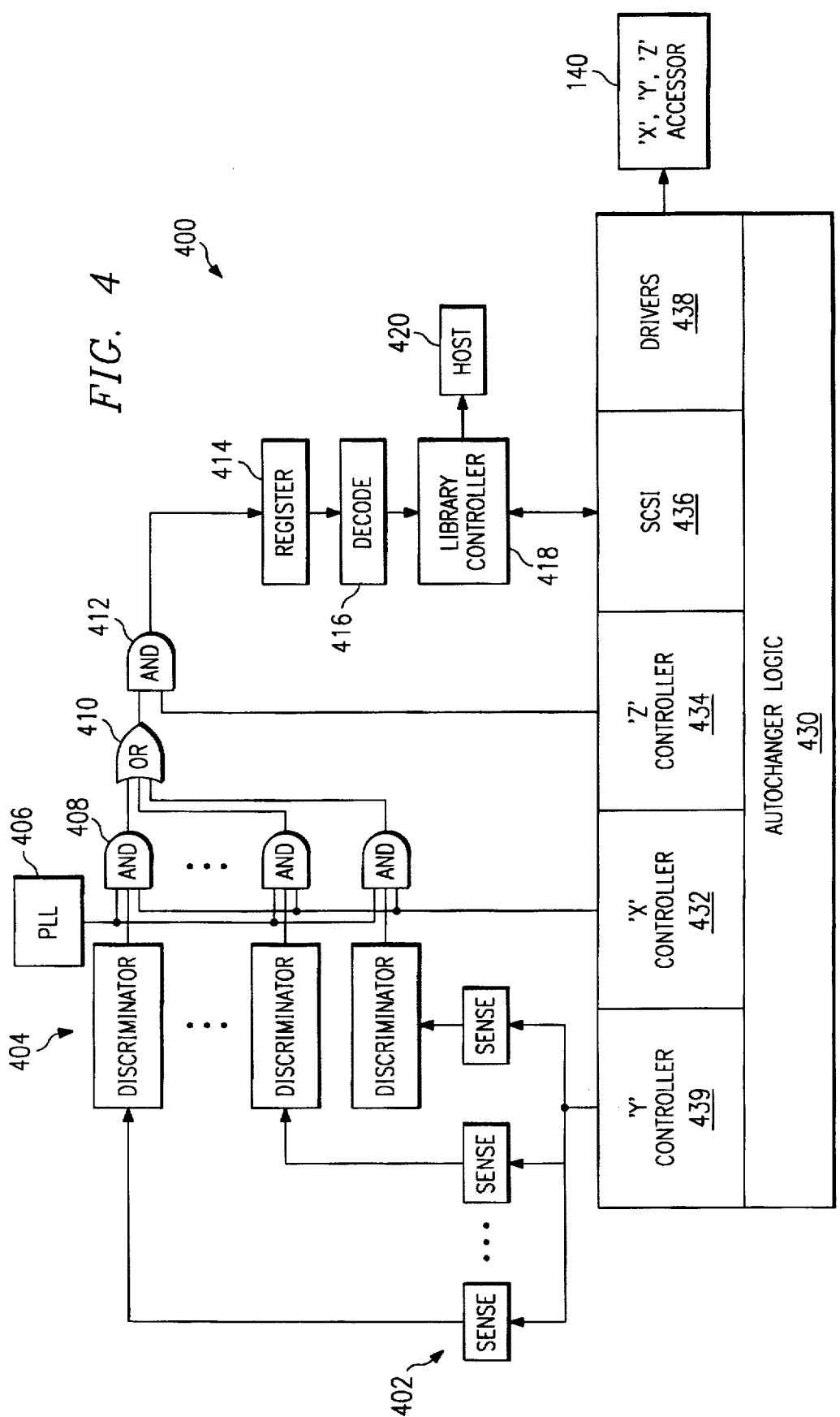

5,729,464

MEDIA IDENTIFICATION IN AN AUTOMATED DATA LIBRARY

TECHNICAL FIELD OF THE INVENTION

The present invention relates to automated data storage libraries, and in particular, to employing one or more fixed bar code readers to effect media identification while the media is in transit within a library.

BACKGROUND OF THE INVENTION

Automated data storage and retrieval systems, more commonly known as libraries, jukeboxes or autochangers (collectively referred to herein as "libraries"), are frequently used when there is a need to keep relatively large amounts of data available at a cost per gigabyte which is lower than that of solid state memory or hard files. Libraries are available for optical disks, optical tape and magnetic tape media. The optical disks can be, for example, rewritable magneto-optical, rewritable phase change, write-once (WORM), standard CD-ROM, recordable CD-ROM, erasable CD-ROM or high density CD-ROM. Magnetic and optical tape and optical disks (one or more) can be contained within a rigid protective housing or cartridge. Additionally, some libraries have been designed for optical disks which are not in a protective housing ("bare" disks) or which are retained in open trays. And, some libraries have been designed for storing and transporting "magazines" containing several media-containing cartridges or trays. As used herein, unless otherwise specified, the term "media" will be used generically to refer to any media by itself and the term "cartridge" will be used generically to refer to any protective housing, without regard to the type of housing. And, the term "data unit" will refer generically to a cartridge, a tray/disk combination, a bare disk or a magazine.

Because libraries are well known, only a general description will be provided. A typical library contains one or more banks or columns of storage cells dimensioned to hold the appropriate data unit, one or more drive units to read data from media mounted in the drive (and usually also write data to the media) and an accessor to transport a selected data unit between a storage cell and a drive. The accessor includes a hand-like gripper or equivalent device to remove/insert a data unit from/into a storage cell or drive and hold the data unit while it is transported. The library may also include an input/output station through which an operator can insert/withdraw data units into/from the interior of the library.

The elements of a library are coupled to and controlled by a library manager which can be a dedicated computer (such as a personal computer) which, in turn, is coupled to a host computer. Alternatively, the library manager can be a non-dedicated host. Commands are exchanged between the host and the library manager and between the library manager and the elements of the library. Data read from or to be written to media is exchanged between the host and a drive. In some systems, such data passes through the library manager; in other systems, such data is exchanged directly, by-passing the library manager.

In many libraries, the cartridges have a machine readable label on a front-facing edge which is visible when the cartridge is in a storage cell. A reader, such as a vision system or bar code scanner mounted on the accessor, "reads" the label to verify that a particular cartridge is the cartridge which has been selected to be transported to a drive. A reader adds mass to the accessor, thereby increasing the power requirements or reducing the accessor's acceleration/deceleration. Moreover, a library for trays and bare disks may be unable to perform any identifying operation because of the impracticality of placing labels on the front-facing edges of trays and bare disks. And, if the reader fails, the library may have to be shut down until repairs can be made.

The library manager must keep have a system to track all cartridges in the library, including those which are imported (inserted) and those which are exported (removed). Typically, the library manager retains a table having entries for each cartridge identification number and its physical location in the array of storage cells. As cartridges are transported between drives and cells, the table is updated. The table is also updated when a new cartridge is added to or removed from the library through the input/output station. However, if a library door or access panel is opened, the library manager may be notified but cannot determine whether any cartridges were inserted or removed manually (rather than through the input/output station) or, if so, their ID numbers and location. Consequently, in such a situation, the library manager directs that an inventory be performed and the ID/location table be updated to reflect any changes.

In a library having no reader, an inventory is performed by transporting each cartridge in turn from a storage cell to an empty drive, mounting the cartridge, reading its ID, then returning the cartridge to a cell. For an optical library in which mounting and demounting a cartridge includes spin-up and spin-down time, respectively, 15 to 20 seconds may be required to process one cartridge can be and the total time required to inventory a large library can become substantial.

SUMMARY OF THE INVENTION

In view of the foregoing, it is an object of the present invention to enable a library to conduct an inventory of various types of data units.

It is another object to reduce the time necessary for a library to conduct an inventory.

It is a further object to reduce the mass which an accessor carries without affecting the ability of a library to read machine readable labels on the data units.

It is still a further object to increase the degree of freedom of an accessor by allowing it to reverse (flip) a cartridge without interference by scanner cables.

These and other objects are achieved in this invention by providing automated storage library with one or more fixed devices to read bar codes or other machine readable labels on data units. In one embodiment, each column of storage cells in a library has a dedicated reading device fixed in close proximity to the column to read labels as data units are inserted/removed into/from storage cells in a column. Preferably, the reading device includes a lens having a variable focus which is synchronized with movement of the accessor in a direction parallel to the column. In another embodiment, a reading device is fixed in close proximity to a drive to read labels as data units are loaded/ejected into/from the drive. In still another embodiment, a reading device is fixed in close proximity to an input/output station to read labels as data units are loaded/ejected into/from the I/O station.

The foregoing and other features and advantages of the invention will be apparent from the following more particular description of preferred embodiments of the invention, as illustrated in the accompanying drawings.

BRIEF DESCRIPTION OF THE DRAWINGS

FIG. 1 shows an isometric view of a library of the present invention, while FIGS. 1A and 1B show enlarged isometric views of particular portions of the library;

FIG. 4 is a block diagram of a logic circuit for managing multiple readers.

DETAILED DESCRIPTION OF THE INVENTION

Figures 1, 1A, 1B:
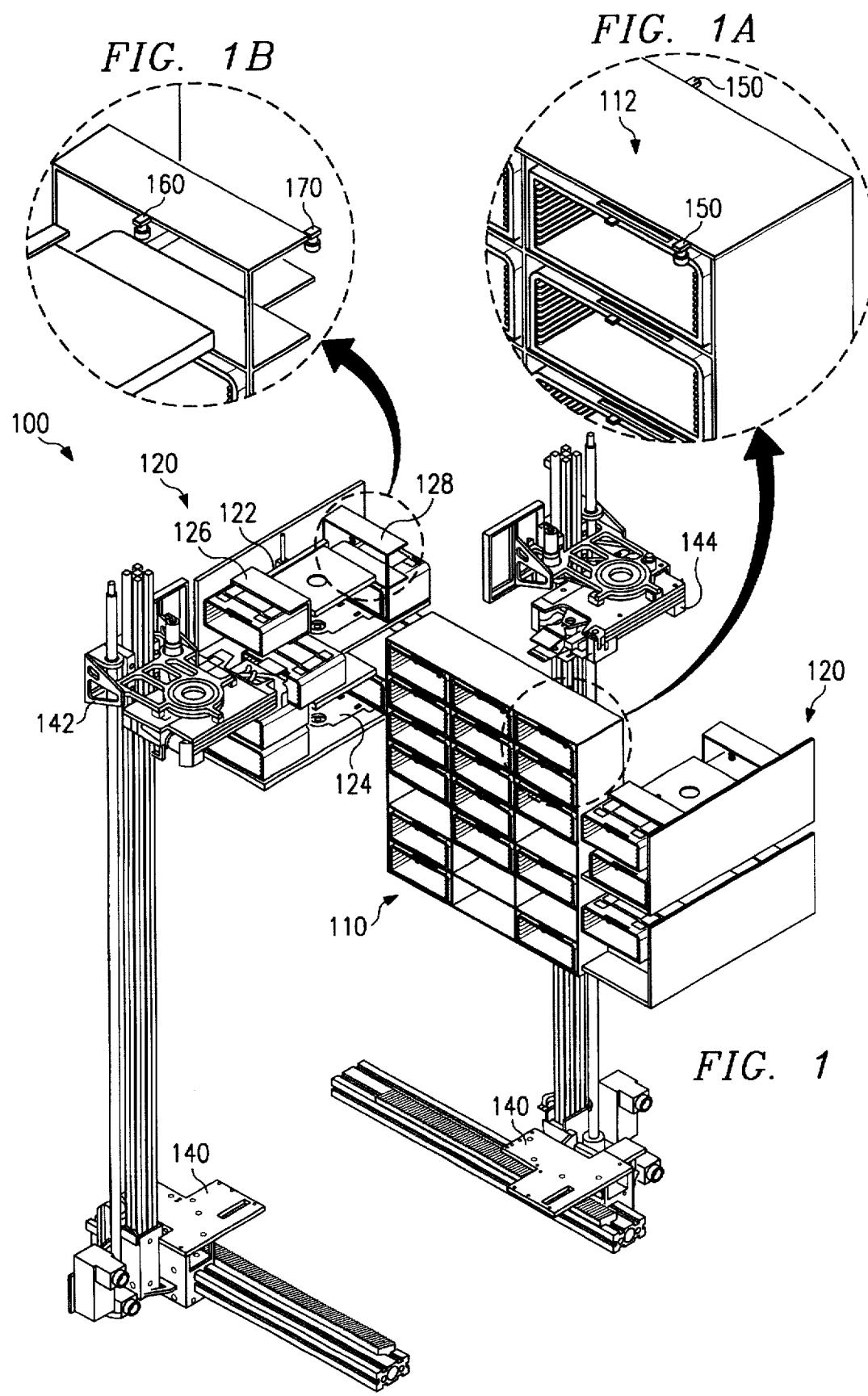
Figure 2:
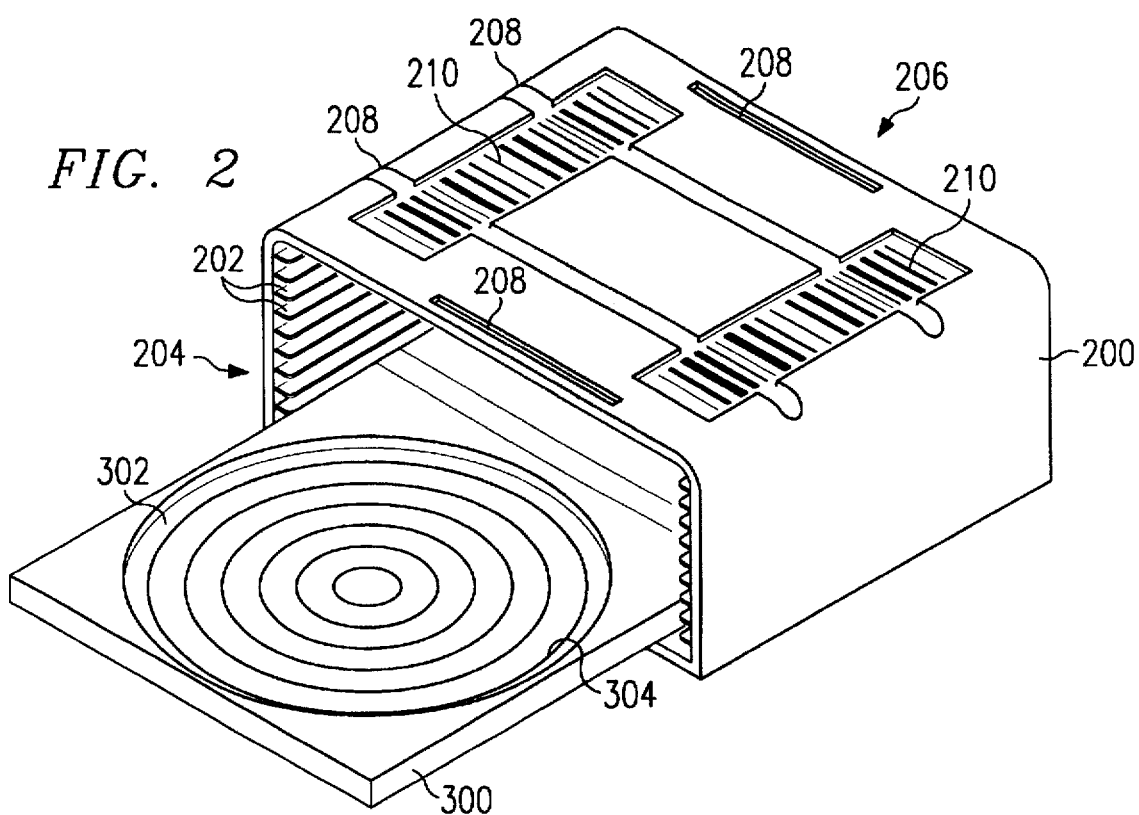
FIG. 2 is an isometric view of a multi-disk magazine having a linear bar code on a surface thereof and showing a concentric bar code on a surface of a disk retained within the cartridge.

FIG. 1 illustrates a data storage library 100 which includes a plurality of disk-containing magazine storage bins 110 arranged in vertical columns. The description of the particular library 100 is for illustrative purposes only and is not intended to be limiting. It will be appreciated that the present invention can be employed with other library configurations. The library 100 has front and back sides and right and left ends which are so designated only for descriptive purposes. Each magazine bin 110 has front and back open ends so that it can be accessed from opposite sides. Accordingly, a magazine stored in a storage bin 110 can be inserted or withdrawn from either the front or back of the storage bin 110. An exemplary magazine 200 for containing disks is illustrated in FIG. 2. The magazine 200 has a plurality of receptacles 202, each receptacle being capable of supporting a tray 300 which, in turn, supports a disk 302. The magazine 200 has front and back open ends 204 and 206. Accordingly, the tray 300 with the disk 302 can be inserted or withdrawn from either open end 204 or 206. The magazine 200 is provided with various front, back, top and bottom features 208 which cooperate with corresponding features in accessor grippers and magazine mounts, described below.

As shown in FIG. 1, a plurality of disk drive and disk loader combinations 120 are arranged in a vertical column at the right and left ends of the magazine storage bins 110. The disk loader is located at 122 and the disk drive is generally located at 124. The operation of these components is discussed in more detail in commonly-assigned U.S. application Ser. No. 08/363,164 entitled QUICK ACCESS DATA STORAGE LIBRARY WITH BACKUP CAPABILITY, filed Dec. 22, 1994, and therefore only a general description will be provided herein.

A cluster of magazine mounts is positioned adjacent to each drive and to a disk loader assembly 120. The cluster includes a pair of vertically stacked magazine mounts 126 and 128 at the front and back sides of the disk drive and disk loader combination 120. Features on the magazine mounts cooperated with the corresponding features 208 on the magazines to insure that the magazines are firmly retained in the magazine mounts with open ends of the magazines facing the disk loader 122 so that trays with disks can be transported from the magazines to the disk drive 124.

As further shown in FIG. 1, front and back magazine transport assemblies or accessors, generally shown at 140, are located on the front and back sides of the magazine storage bins 110, respectively. A front magazine picker 142 is shown inserting a magazine into the bottom front magazine mount. When magazines are mounted in the front and back magazine mounts, the disk loader 122 can select a tray with a disk from a receptacle in any of the mounted magazines for transporting the disk to the drive 124. The library 100 is also provided with a back magazine picker 144 which can withdraw and insert magazines in the back open ends of the magazine storage bins 110.

The enlarged portions A and B of FIG. 1 illustrate the present invention installed at the top of a column 112 of storage bins 110 and at the top of a column of magazine mounts 128, respectively. In enlarged portion A, the present invention comprises a bar code reader 150 at the top of two opposing top corners of the column 112. Each column in the array of storage bins 110 includes a similar set of readers. Each reader 150 includes light source, aimed to project a light beam downward across an open end of the magazine storage bins in the column 112, and a light detector aimed to receive the light beam after the beam is reflected off of an object. The enlarged portion B shows two bar code readers 160, 170, a first reader 160 at the top center of the open end of the top magazine mount 128, and a second reader 170 on the opposite end of the top magazine mount 128 above an opening for manually inserting or removing a cartridge or cartridge magazine from the disk loader assembly 120.

Referring to FIG. 2, the magazine 200 includes two linear bar code labels 210 on the top surface, each containing identical identifying information. As the magazine 200 is inserted into or removed from a magazine storage bin in the column 110, the light beam from one of the readers 150 is reflected off of the bar code 210 and received by the detector. The linear motion of the magazine into or out of the bin allows the bar code reader 150 to be fixed and eliminates the necessity for the reader 150 to physically scan the beam across a bar code label 210 (as is done with supermarket checkout scanners). The reader 150 can, therefore, be simple and relatively inexpensive. Including two readers 150 at the top of the bin column 112 and including two bar code labels 210 on the magazine 200 permits the magazine 200 to be inserted/removed into/from either the front or back of a bin without regard to a distinguishing a front and back of the magazine 200. Thus, the information identifying the magazine 200 can always be read.

Preferably, each bar code readers 150 has a zoom lens, or its functional equivalent, which is coordinated with the vertical position of the picker 142 to focus the beam of light on the top of the magazine 200 regardless of the vertical distance between the reader 150 and the storage bin into or from which the magazine 200 will be inserted or removed. Such focus control can be provided by the library controller to which the accessors 140 and pickers 142, as well as the readers 150, are interconnected.

Referring to the enlarged portion B of FIG. 1, the present invention comprises a bar code reader 170 positioned on the top magazine mount 128 above an opening for manually inserting or removing a cartridge or cartridge magazine from the disk loader 120. The reader 170 is aimed to project a light beam across the opening in the disk loader 120 and to read a linear bar code affixed to the surface of the cartridge or the cartridge magazine as either is manually inserted or removed from the disk loader 120. The present invention also comprises a bar code reader 160 at the top center of a column of magazine mounts 128. Each disk 302 in the magazine 200 has an identifying circular bar code label 304 (FIG. 2) affixed to the top surface (data being recorded on the bottom surface). The circular bar code label 304 is read from the outer diameter of the disk to the center regardless of the rotational orientation of the label 304 with respect to the fixed reader 160. The reader 160 is aimed to project a light beam across the openings of the magazine mounts 128 and read the circular bar code label 304 on the disk 302 as the disk 302 is removed from the magazine 200 by the disk loader 122. If the number of vertically stacked magazine mounts is sufficiently large, it is preferable that the reader 160 have a zoom lens coordinated with the vertical position of the disk loader 122. Otherwise, the maximum distance between the reader 160 and the bottom magazine mount will be small enough that a fixed focus reader will perform adequately. The distance at over which a fixed-focus reader can be employed is separately determined for each installation environment and depends upon such factors as the wavelength and intensity of the scanner light source, the aperture and depth of field of the scanner, the ambient light in the library and the reflective profile and properties of the target bar code labels.

Figure 3:
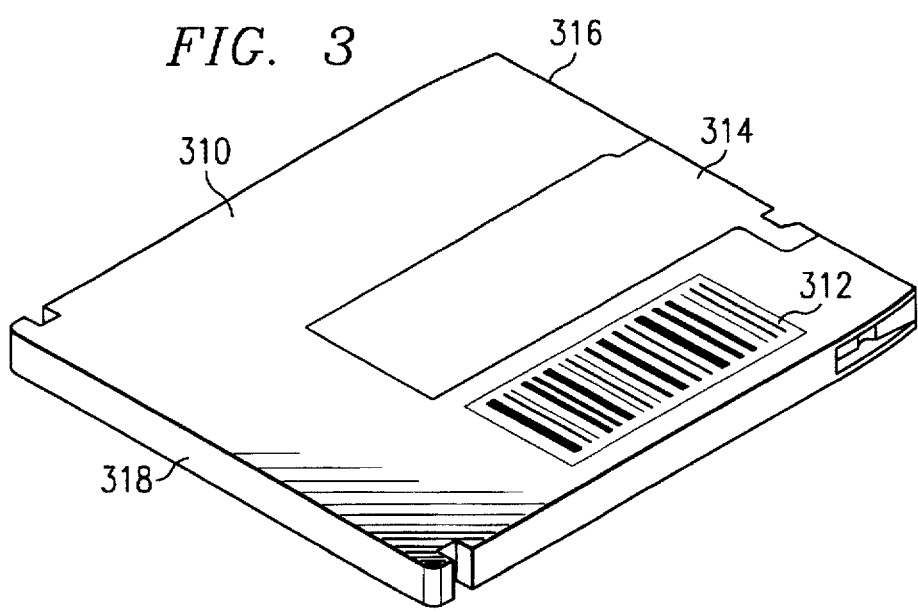
FIG. 3 is an isometric view of a data cartridge having a linear bar code on a surface thereof.

The configuration of bar code readers 150 shown in enlargement A of FIG. 1 can also be employed in a library for storing data cartridges, such as the cartridge 310 in FIG. 3 containing an optical disk. The cartridge 310 has a linear bar code label 312 affixed to the top (or bottom) of the cartridge 310, offset to one side to avoid interfering with the shutter door 314. As the cartridge 310 is inserted or removed from a bin or drive, a fixed bar code reader reads the identifying label 312. Unlike the magazine 200 and disk tray 300 of FIG. 2, the cartridge 310 has a defined front 316 and back 318 and can only be inserted into a storage bin or drive in one direction. However, when the cartridge 310 contains a double-sided disk, the cartridge 310 is flipped in order to access the reverse side. Therefore, a second bar code label is affixed to the bottom (as oriented in FIG. 3) of the cartridge 310. If the second label is affixed directly underneath the first label 312, a second reader is required as the second label will be offset on the opposite side when the cartridge 310 is flipped. If, rather, the second label is offset to the same side as the first label 312, then a single reader can read the labels regardless of which side of the cartridge 310 is facing up. In a conventional library for double-sided optical cartridges, the gripper must reverse or flip the cartridge in order for both sides to be accessed. If such a library includes a bar code reader fixed to the gripper, reader cables may interfere with the action of the gripper. Or, to avoid such a concern, the reader may be mounted on top of the accessor. However, a top mounted reader would require that the library have sufficient height and this extra height could not be filled with storage cells. Therefore, it will be appreciated that the fixed positions of the bar code readers of the present invention avoid either cable entanglement or wasted space in the library.

Using the reader configurations of the present invention, the time required to conduct an inventory of data cartridges in a library is reduce from about 15 to 20 seconds to about 2 seconds per cartridge. When an inventory is conducted, the accessor pulls a cartridge out of a storage cell such that the bar code label can be read by the fixed reader, then re-inserts the cartridge back into the cell and moves to the next cell. A hand-held wand-type scanner or similar device can be incorporated outside the library and interconnected to the library controller for manual entry of cartridges.

FIG. 4 is a block diagram of a logic circuit 400 for managing multiple stationary bar code readers or sensors 402. As noted above, the readers 402 can monitor data unit transfers in storage columns, drive units and input/output stations. The analog output of each reader 402 is transmitted to a wave shaping discriminator 404 for conversion into a digital logic signal. The logic signals from the discriminators 404 are synchronized with a phase locked loop 406 and gated 408 into an OR gate 410 to ensure that the signal from only one reader 402 is processed at one time. A logic signal from a column (X-axis motion) decoder 432 in an autochanger 430 is also gated 408 into the OR gate 410. The autochanger 430 outputs a logic signal from an insert and retrieve clock 434 for synchronizing the reach motion (Z-axis) of the accessor/gripper 140 with the operation of the logic circuit 400. The insert and retrieve clock signal is transmitted to an AND gate 412 where it is AND'ed with the output from the OR gate 410 such that the timing of the output of the active bar code reader 402 is synchronized with the speed of the cartridge being inserted or removed (in the Z-direction). The resulting bar code signal from the AND gate 412 is stored in a shift register 414. The information stored in the shift register 414 is decoded 416 and transmitted to the library controller 418 to update the stored inventory table. The library controller 418 is also interconnected with a host device 420 for receiving and transmitting control and data signals therebetween.

Preferably, the autochanger logic 430 is a circuit card located in the library itself while the library controller 418 can be a microcomputer dedicated to the library. The autochanger 430 is also interconnected to the library controller 418 through a SCSI interface 436 to enable the library controller 418 to direct the activities of the autochanger 430, including the X, Y and Z motions of the accessor/gripper 140 which is connected to the autochanger 430 through a set of accessor drivers 438.

When any of the readers 402 have variable-focus capability, the autochanger logic 430 outputs a logic signal from a zoom decoder 439 to the appropriate reader 402 to synchronize its focus with the motion of the accessor vertically (Y-axis) along a selected column.

It will be appreciated that in a library with multiple readers 402, the failure of one or even several readers 402 will not prevent the library from performing cartridge identification operations. Such operations can be conducted by transporting cartridges to a storage cell associated with a working reader.

While the invention has been particularly shown and described with reference to preferred embodiments thereof, it will be understood by those skilled in the art that various changes in form and details may be made therein without departing from the spirit and scope of the invention.

What is claimed is:

1. An automated library system for storing and retrieving magazines housing at least one optical disk, each magazine having a bar code on a surface thereof identifying the magazine and each disk having a concentric bar code on a surface thereof identifying the disk and characteristics thereof, the library system comprising:

a plurality of magazine-retaining storage cells arranged in at least one column;

an optical drive unit capable of loading a selected one of the plurality of optical disks from a selected one of the magazines;

an accessor for transporting a selected magazine between a storage cell and said optical drive unit;

a gripper mounted on said accessor for inserting and removing the selected magazine into and from a storage cell and said optical drive unit;

a first bar code reader fixed proximate a first end of each column of storage cells and aimed to read the bar code on the surface of a magazine when the magazine is inserted into or removed from a storage cell in the column, said first bar code reader operable to generate a first information signal identifying the magazine; and a second bar code reader fixed proximate said optical drive unit and aimed to read the concentric bar code on the surface of a selected disk when the disk is inserted into or removed from said optical drive unit, said second bar code reader operable to generate a second information signal identifying the selected disk.

2. The library system of claim 1, further comprising:
a third bar code reader fixed proximate to a magazine loader and aimed to read the bar code on the surface of a magazine when the magazine is manually inserted into or removed from said magazine loader, said third bar code reader operable to generate a first information signal identifying the magazine.

3. The library system of claim 1, wherein said first bar code reader includes a lens having a variable focus synchronized with the movement of said gripper in a direction substantially co-linear with the aiming direction of said first bar code reader.

4. The library system of claim 1, further comprising an accessor logic module interconnected with said second bar code reader to receive identifying and characteristic information from said second bar code reader about an optical disk to be mounted in said optical drive unit and transmit the information to said optical drive unit, enabling said optical drive unit to prepare to mount the optical disk.

5. The library system of claim 4, wherein said accessor logic module further comprises means for receiving first information signals transmitted from any of said first bar code readers.

6. An automated library system for storing and retrieving removable data cartridges, each data cartridge having a bar code on a surface thereof identifying the data cartridge and characteristics thereof, the library system comprising:
a plurality of cartridge-retaining storage cells arranged in at least one column;
an data drive unit capable of loading a selected one of the plurality of cartridges;
an accessor for transporting a selected cartridge between a storage cell and said drive unit and inserting and removing the selected cartridge into and from a storage cell and said drive unit;
a first bar code reader fixed proximate a first end of each column of storage cells and aimed to read the bar code on the surface of a cartridge when the cartridge is inserted into or removed from a storage cell in the column, said first bar code reader operable to generate a first information signal identifying the cartridge and characteristics thereof; and
an accessor logic module coupled to receive the first information signal from said first bar code reader about a cartridge to be mounted in said drive unit and transmit the identifying and characteristic information to said drive unit, enabling said drive unit to prepare to mount the cartridge.

7. The library system of claim 6, wherein said first bar code reader includes a lens having a variable focus synchronized with the movement of said accessor in a direction substantially co-linear with the aiming direction of said first bar code reader.

8. The library system of claim 6, further comprising:
a second bar code reader fixed proximate to a cartridge loader and aimed to read the bar code on the surface of a cartridge when the cartridge is manually inserted into or removed from said cartridge loader, said second bar code reader operable to generate a second information signal identifying the cartridge and characteristics thereof.

9. The library system of claim 8, wherein:
said first bar code reader includes a lens having a variable focus synchronized with the movement of said accessor in a direction substantially co-linear with the aiming direction of said first bar code reader; and said second bar code reader includes a lens having a fixed focus.

10. The library system of claim 6, further comprising:
a third bar code reader fixed proximate said data drive and aimed to read the bar code on the surface of a cartridge when the cartridge is inserted into or removed from said data drive by said accessor, said third bar code reader operable to generate a third information signal identifying the cartridge and characteristics thereof.

11. The library system of claim 10, wherein:
the data cartridge comprises an optical disk; and
the bar code comprises a concentric bar code on a surface of the optical disk.

12. The library system of claim 10, wherein:
the data cartridge comprises an optical disk cartridge; and
the bar code comprises a linear bar code on a surface of the optical disk cartridge.

13. The library system of claim 10, wherein:
the data cartridge comprises a magnetic tape cartridge; and
the bar code comprises a linear bar code on a surface of the tape cartridge.

14. An automated library system for storing and retrieving removable data units, each data unit having a bar code on a surface thereof identifying the data unit and characteristics thereof, the library system comprising:
a plurality of data unit-retaining storage cells arranged in at least one column;
a data drive unit capable of loading a selected one of the plurality of data units;
an accessor for transporting a selected data unit between a storage cell and said drive unit and inserting and removing the selected data unit into and from a storage cell and said drive unit;
a plurality of bar code readers fixed proximate a first end of each column of storage cells and aimed to read the bar code on the surface of a data unit when the data unit is inserted into or removed from a storage cell in the column, each of said bar code readers operable to generate a first information signal identifying the data unit and characteristics thereof, said bar code readers having a variable focus lens;
a library controller coupled to receive data unit access commands from a host device; and
an accessor logic module, comprising:
a first interface coupled to said library controller for receiving accessor commands therefrom;
a second interface coupled to said accessor for directing the motions of said accessor in X, Y and Z directions;
a bar code reader focus controller coupled to receive commands directing the motion of said accessor in the Y-direction, said bar code reader focus controller generating a Y-signal to said variable focus lenses, wherein the focus of said variable focus lenses is synchronized with the movement of said accessor in the Y-direction;
a column decoder coupled to receive commands directing the motion of said accessor in the X-direction, said column decoder generating an X-signal;
an insert/retrieve decoder coupled to receive commands directing the motion of said accessor in the Z-direction, said column decoder generating a Z-signal indicative of the motion of the gripper in the Z-direction;
a plurality of analog-to-digital converters, each coupled to receive an output signal from one of said bar code readers;

a plurality of first AND gates, each coupled to receive an output signal from one of said analog-to-digital converters, the X-signal and a synchronizing signal from a phase locked loop;

an OR gate coupled to receive outputs from each of said first AND gates;

a second AND gate coupled to receive the Z-signal and an output from said OR gate;

a shift register coupled to receive an output from said second AND gate and for storing an information signal; and a decoder coupled to receive outputs from said shift register and for transmitting a decoded information signal to said library controller.

\* \* \* \* \*